US012667921B2

(12) United States Patent
Chen

(10) Patent No.: US 12,667,921 B2
(45) Date of Patent: Jun. 30, 2026

(54) AUTOMATICALLY REPLACEABLE FIXTURE PLATE

(71) Applicant: SHIN-YAIN INDUSTRIAL CO., LTD., Taichung City (TW)

(72) Inventor: Pen Hung Chen, Taichung City (TW)

(73) Assignee: SHIN-YAIN INDUSTRIAL CO., LTD., Taichung City (TW)

( * ) Notice: Subject to any disclaimer, the term of this patent is extended or adjusted under 35 U.S.C. 154(b) by 345 days.

(21) Appl. No.: 18/124,753

(22) Filed: Mar. 22, 2023

(65) Prior Publication Data

US 2024/0316705 A1    Sep. 26, 2024

(51) Int. Cl.
*B23Q 1/01*        (2006.01)
*B23Q 1/03*        (2006.01)
*B23Q 3/18*        (2006.01)
(52) U.S. Cl.
CPC .............. *B23Q 1/015* (2013.01); *B23Q 1/03* (2013.01); *B23Q 3/18* (2013.01)

(58) Field of Classification Search
CPC ...... B23Q 1/0072; B23Q 1/009; B23Q 3/066; B23Q 3/102; B23Q 3/12; B25B 5/006; B25B 1/2484; B25H 1/08; B25J 15/04
See application file for complete search history.

(56) References Cited

U.S. PATENT DOCUMENTS

2007/0063405 A1 *    3/2007   Troxler .................... B23H 7/26
                                                         269/309

* cited by examiner

*Primary Examiner* — Tyrone V Hall, Jr.
(74) *Attorney, Agent, or Firm* — Birch, Stewart, Kolasch & Birch, LLP

(57)                    ABSTRACT
An automatically replaceable fixture plate is configured to be mounted onto a saddle and is configured to directly fix a workpiece or mount a fixture for fixing the workpiece. The automatically replaceable fixture plate has a post and a main plate body. The post is configured to be clamped or released by a tightening and loosening mechanism of the saddle for being fixed to or detached from the saddle. The main plate body is fixedly connected to the post and has multiple fixing holes to make the main plate body fixed with respect to the workpiece or the fixture via bolts. With the post and the main plate body, the automatically replaceable fixture plate allows a machine tool to automatically replace the means of fixing the workpiece.

6 Claims, 10 Drawing Sheets

50

30A

20A

10

91

92

AUTOMATICALLY REPLACEABLE FIXTURE PLATE

BACKGROUND OF THE INVENTION

1. Field of the Invention

The present invention relates to a fixture plate applied in a machine tool, and particularly to an automatically replaceable fixture plate.

2. Description of Related Art

A conventional machine tool integrates capabilities of different processes such as turning, milling, and drilling, and chamfering and are automatic in these processes. When a workpiece is placed into a machine, a processing tool on the spindle is automatically replaced, which allows all the processes to be finished in a single machine.

Although replacement of the processing tool is already automatic in the conventional machine tool, replacement of the means of fixing the workpiece is still limited. For example, with reference to FIG. 10, a saddle 91 in a conventional machine tool is shown. The conventional machine tool is specifically a five-axis machining center, and the saddle 91 is configured to rotate around a linear axis of the conventional machine tool and is regarded as a rotating axis of the conventional machine tool. A chuck 92 is mounted onto the saddle 91 for fixing the workpiece and can be pneumatic or hydraulic. Mounting of the chuck 92 is usually manual; for example, the chuck 92 can be fixed onto the saddle 91 via bolts. Once the workpiece is appropriate for being fixed by another chuck or clamp, replacement between the chuck 92, other chucks, and clamps is still done manually. According to the above description, automation of the conventional machine tool is not enough and still needs to be improved.

To overcome the shortcomings of the replacement of the means of fixing the workpiece in the conventional machine tool, the present invention tends to provide an automatically replaceable fixture plate to mitigate or obviate the aforementioned problems.

SUMMARY OF THE INVENTION

The main objective of the present invention is to provide an automatically replaceable fixture plate that may automate the replacement of the mechanism for fixing the workpiece and thus reduce the labor cost.

The automatically replaceable fixture plate is configured to be mounted onto a saddle in a machine tool to directly fix a workpiece or mount a fixture for fixing the workpiece thereon; the saddle has a tightening and loosening mechanism, and the automatically replaceable fixture plate has a post and a main plate body. The post is configured to be clamped or released by the tightening and loosening mechanism for being fixed to the saddle or detached from the saddle. The main plate body is fixed to the post and has multiple fixing holes configured to make the main plate body fixed with respect to the workpiece or the fixture via bolts.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
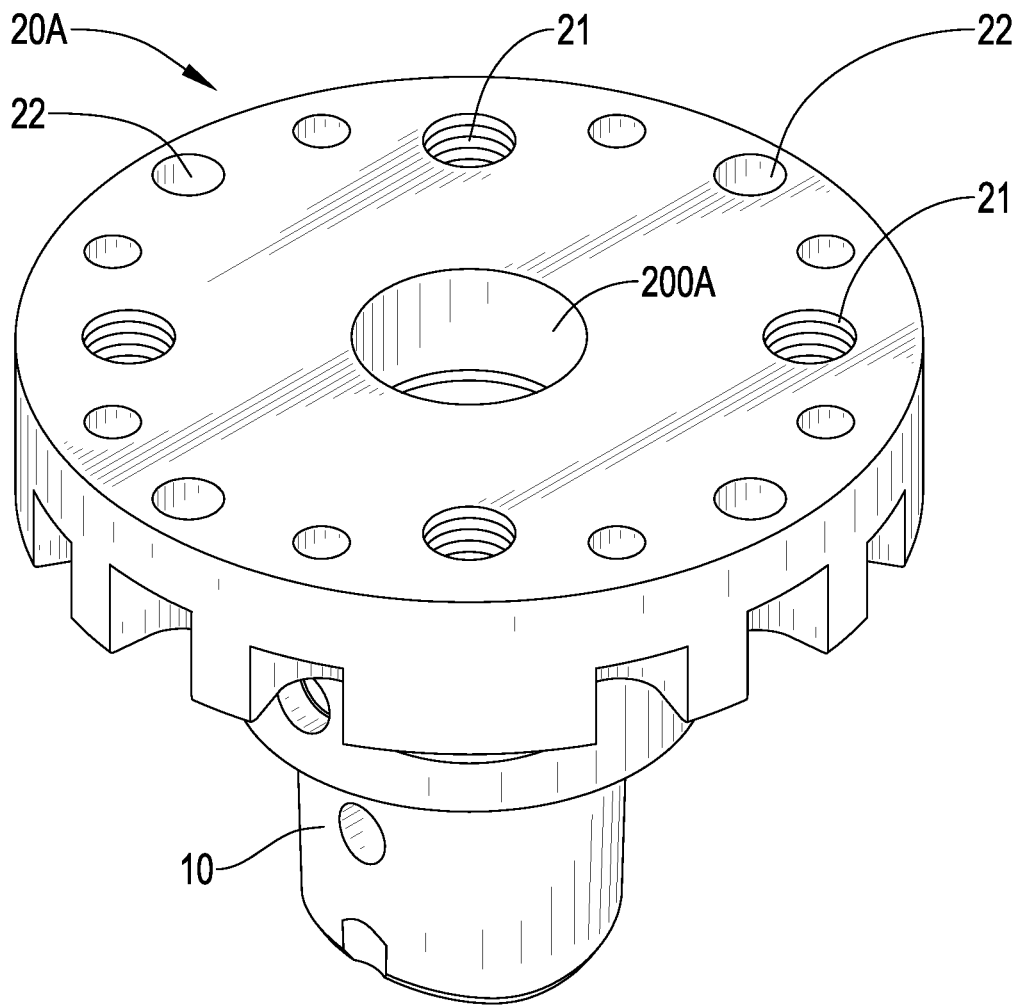
FIG. 1 is a perspective view of an automatically replaceable fixture plate of a first preferred embodiment in accordance with the present invention.

With reference to FIG. 1, an automatically replaceable fixture plate of a first preferred embodiment in accordance with the present invention is shown. The automatically replaceable fixture plate is configured to be mounted onto a saddle 81 of a machine tool in FIG. 4 and is configured to directly fix a workpiece or mount a fixture for fixing the workpiece thereon so as to allow the machine tool to process the workpiece. The saddle 81 has a tightening and loosening mechanism, and the automatically replaceable fixture plate has a post 10 and a main plate body 20A.

The post 10 is the main construction for the automatically replaceable fixture plate to be fixedly mounted onto the saddle 81. Specifically, with reference to FIG. 4, the saddle 81 has a plate mount 82 having a mounting opening 821 for the post 10 to be inserted into. When mounting the automatically replaceable fixture plate onto the saddle 81, the post 10 is inserted into the mounting opening 821 and is clamped by the tightening and loosening mechanism inside the saddle 81 so as to make the automatically replaceable fixture plate and the saddle 81 fixed with respect to each other. When detaching and replacing the automatically replaceable fixture plate, the post 10 is released by the tightening and loosening mechanism of the saddle 81 and is drawn out from the mounting opening 821 and be detached from the saddle 81. More specifically, the post 10 and the tightening and loosening mechanism of the saddle 81 adopt the conventional tightening and loosening configuration between a tool post and a spindle in a machine tool. In the first preferred embodiment, each one of the post 10 and the mounting opening 821 has a polygonal tapered profile, and the tightening and loosening mechanism of the saddle 81 can be pneumatic or hydraulic.

With reference to FIG. 1, the main plate body 20A is fixed to the post 10 and has multiple fixing holes configured to make the main plate body 20A fixed with respect to the workpiece or the fixture via bolts. With the main plate body 20A, the automatically replaceable fixture plate is configured to directly fix the workpiece or mount the fixture for fixing the workpiece and having the same effect. In the first preferred embodiment, the multiple fixing holes include multiple threaded holes 21 and multiple through holes 22. In other embodiments, the multiple fixing holes can have only multiple threaded holes 21 or only multiple through holes 22. In the first preferred embodiment, the multiple threaded holes 21 and the multiple through holes 22 can be respectively adopted according to needs of the fixture or the workpiece and the operating direction of the bolts, which broadens the application of the automatically replaceable fixture plate.

Figure 2:
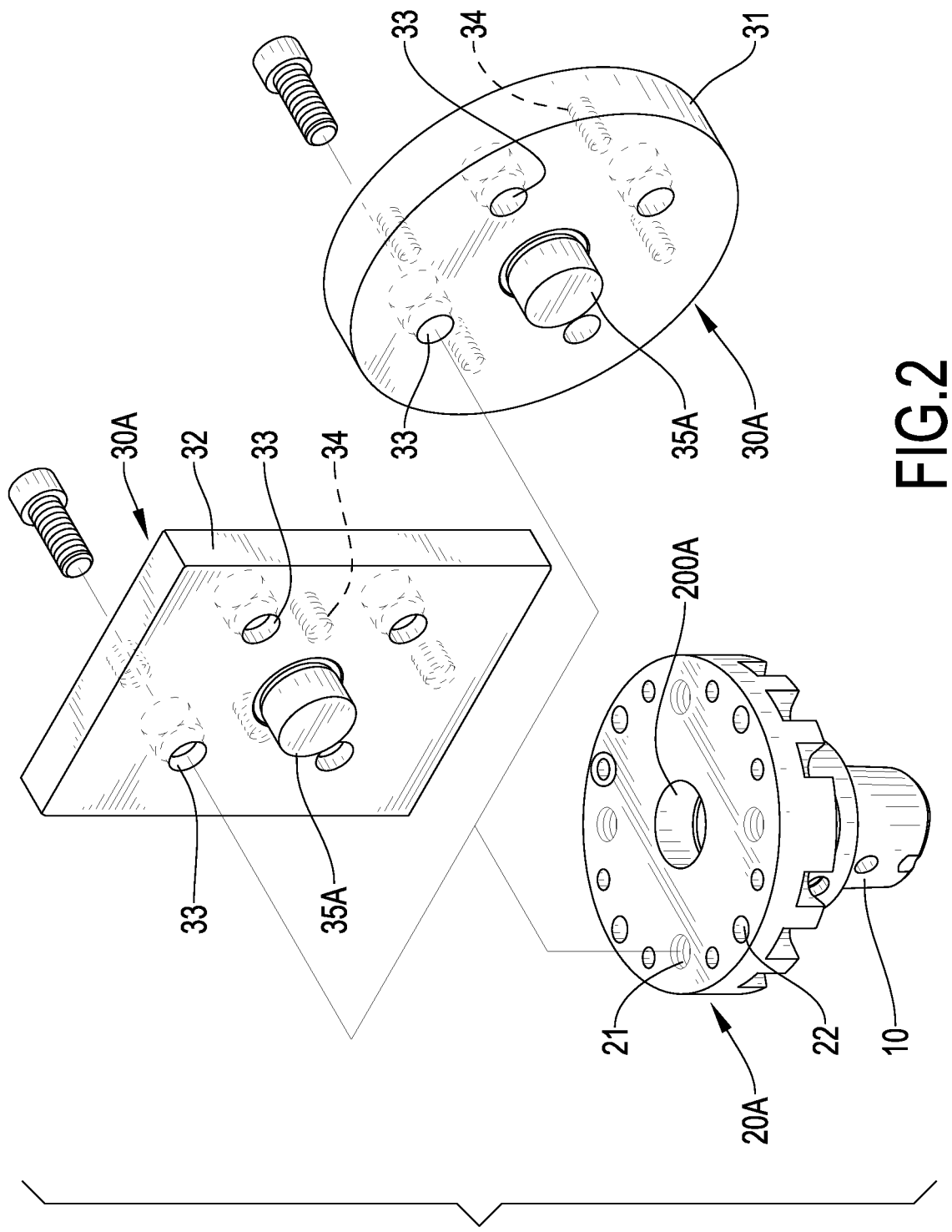
FIG. 2 is an exploded view of the automatically replaceable fixture plate in FIG. 1 having different fixture mounts.

In the following paragraphs, the mode of making the main plate body 20A fixed with respect to the fixture is first described. With reference to FIG. 2, when the automatically replaceable fixture plate is applied for fixing the fixture, the automatically replaceable fixture plate further has a fixture mount 30A, and the fixture mount 30A has a profile matching with a profile of the fixture. For instance, the fixture mount 30A on the right side of FIG. 2 has a circular profile 31, and the fixture mount 30A on the left side of FIG. 2 has a rectangular profile 32; the above two fixture mounts 30A respectively correspond to fixtures having a circular profile and a rectangular profile.

With reference to FIG. 2, the fixture mount 30A has multiple mounting holes 33 and multiple fixture mounting holes 34. Each one of the multiple mounting holes 33 is aligned with a respective one of the multiple fixing holes and is configured to be combined with the respective fixing hole via a bolt to make the fixture mount 30A and the main plate body 20A fixed with respect to each other. Specifically, each one of the multiple mounting holes 33 can be a through hole, and the respective fixing hole is a respective one of the multiple threaded holes 21. The fixture mount 30A and the main plate body 20A are fixed with respect to each other by respectively mounting bolts through the multiple mounting holes 33 and respectively screwing the bolts into the multiple threaded holes 21. In other embodiments, each one of the multiple mounting holes 33 can be a screw hole, and the respective fixing hole is a respective one of the multiple through holes 22; the bolts are operated in opposite directions to be respectively mounted through the multiple through holes 22 and then be respectively screwed into the multiple mounting holes 33. The multiple fixture mounting holes 34 are configured to make the fixture mount 30A and the fixture fixed with respect to each other via bolts. Similar with the multiple mounting holes 33, each one of the multiple fixture mounting holes 34 can be a through hole or a screw hole according to the mounting configuration of the fixture.

Figure 3:
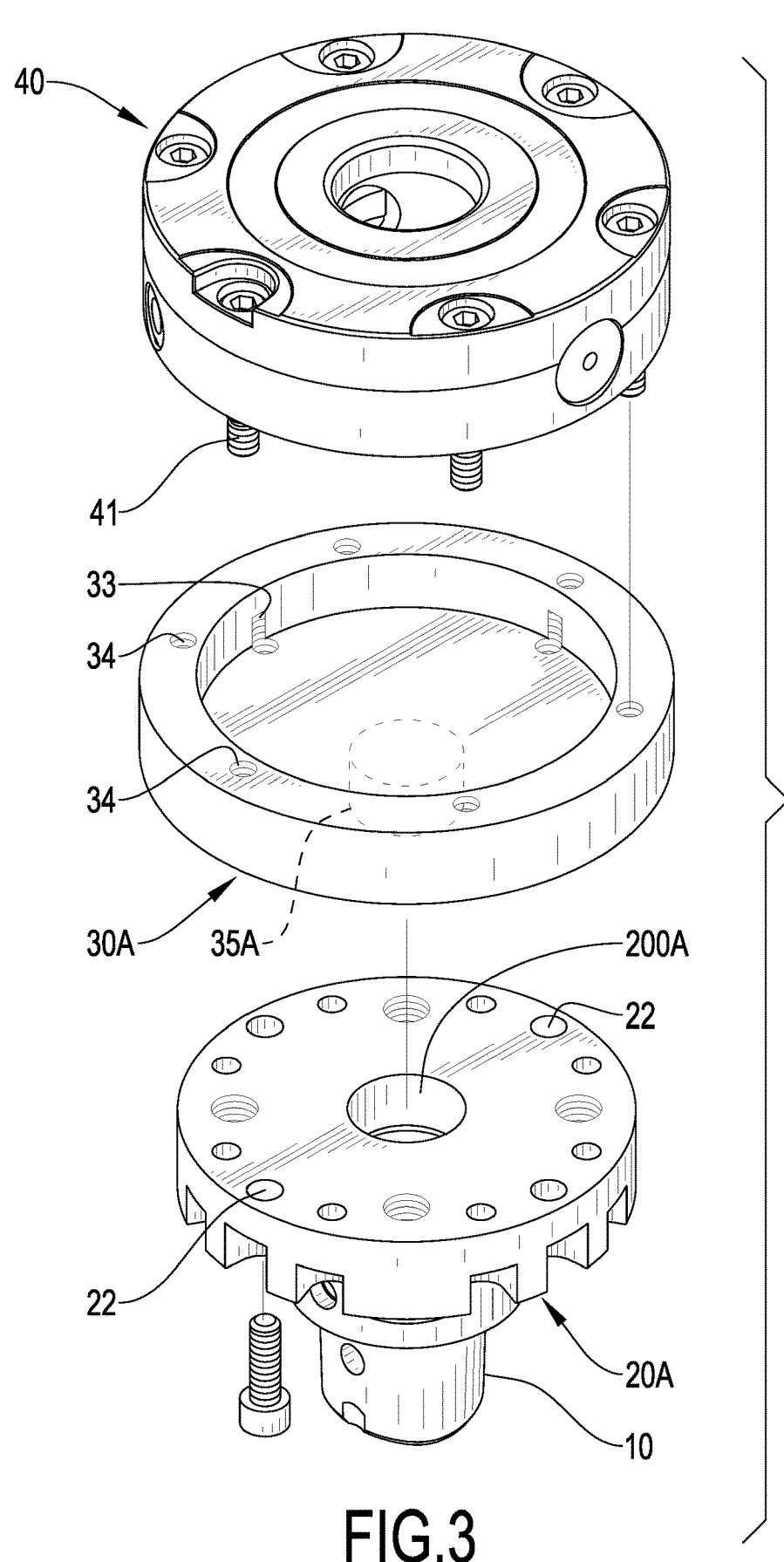
FIG. 3 is an exploded view of the automatically replaceable fixture plate in FIG. 1 applied for mounting a circular clamp.
Figure 4:
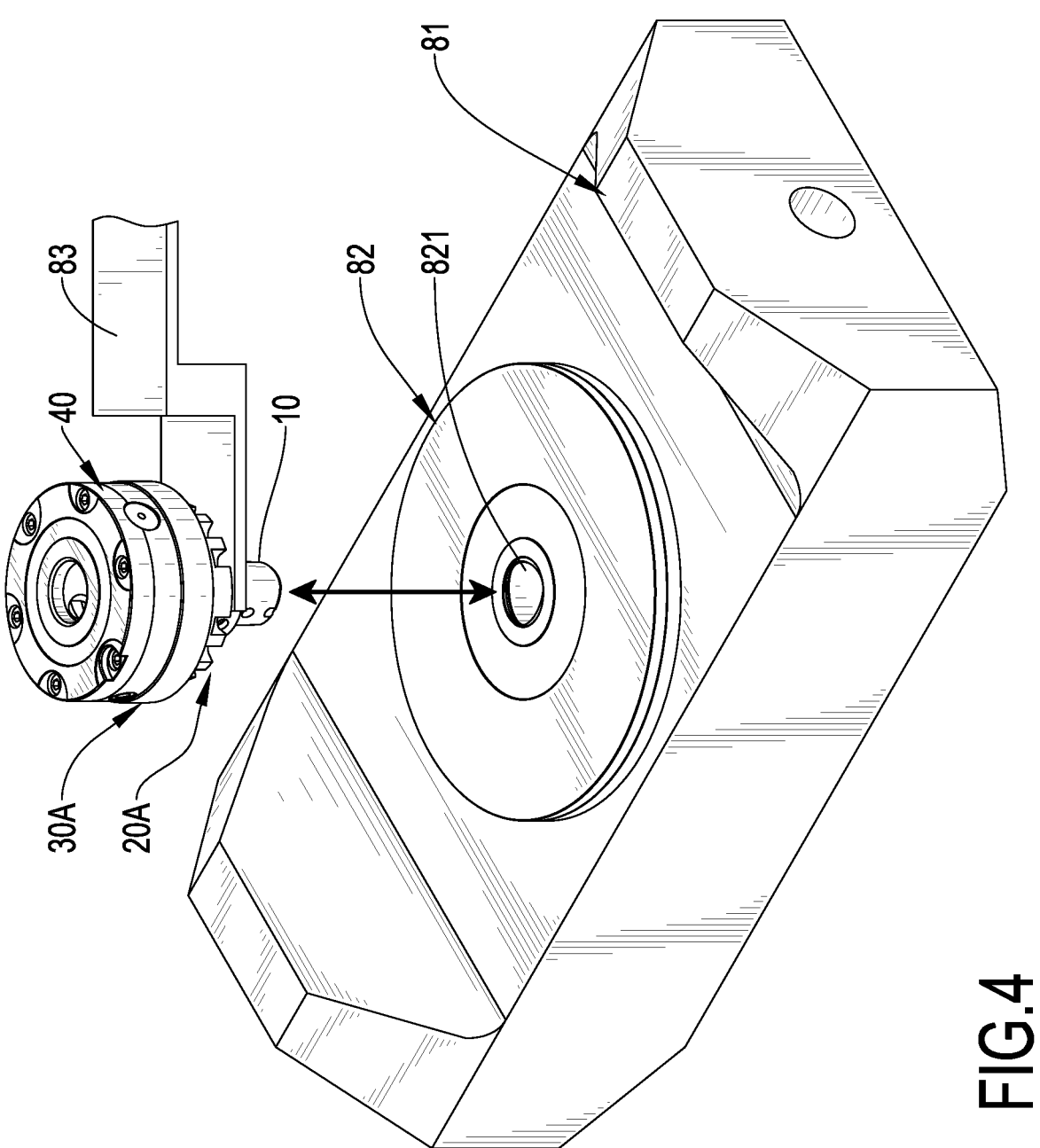
FIG. 4 is an operational view of the automatically replaceable fixture plate in FIG. 3.

With reference to FIG. 3, the automatically replaceable fixture plate can be applied for mounting a circular clamp 40. First, the fixture mount 30A is mounted on the main plate body 20A by respectively mounting bolts through the multiple through holes 22 and respectively screwing the bolts into the multiple mounting holes 33. Then, the circular clamp 40 is fixedly mounted on the automatically replaceable fixture plate by mounting multiple bolts 41 through the circular clamp 40 and respectively screwing the multiple bolts 41 into the multiple fixture mounting holes 34, and the workpiece can be fixed via the circular clamp 40. With reference to FIG. 4, in use, a replacing arm 83 of a machine tool is configured to hold the post 10, move the automatically replaceable fixture plate with the circular clamp 40 to the mounting opening 821 of the plate mount 82, and insert the post 10 into the mounting opening 821; the post 10 is then clamped by the tightening and loosening mechanism of the saddle 81 to make the automatically replaceable fixture plate and the saddle 81 fixed with respect to each other. Thereby, the workpiece can be fixed by the circular clamp 40 mounted on the automatically replaceable fixture plate and thus can be fixed on the saddle 81.

When another workpiece is appropriate for being fixed by another fixture, first, the post 10 is released by the tightening and loosening mechanism of the saddle 81; then, the replacing arm 83 moves to the mounting opening 821, holds the post 10, and draws out the post 10 from the mounting opening 821 so as to detach the automatically replaceable fixture plate with the circular clamp 40 from the saddle 81 and place it to another place. Afterwards, the replacing arm 83 holds the post 10 of the automatically replaceable fixture plate with another fixture and mounts it onto the saddle 81, which allows another workpiece to be fixed by another appropriate fixture. Thereby, the replacement of the fixture can be automated, and the automation of the machine tool is improved.

Figure 5:
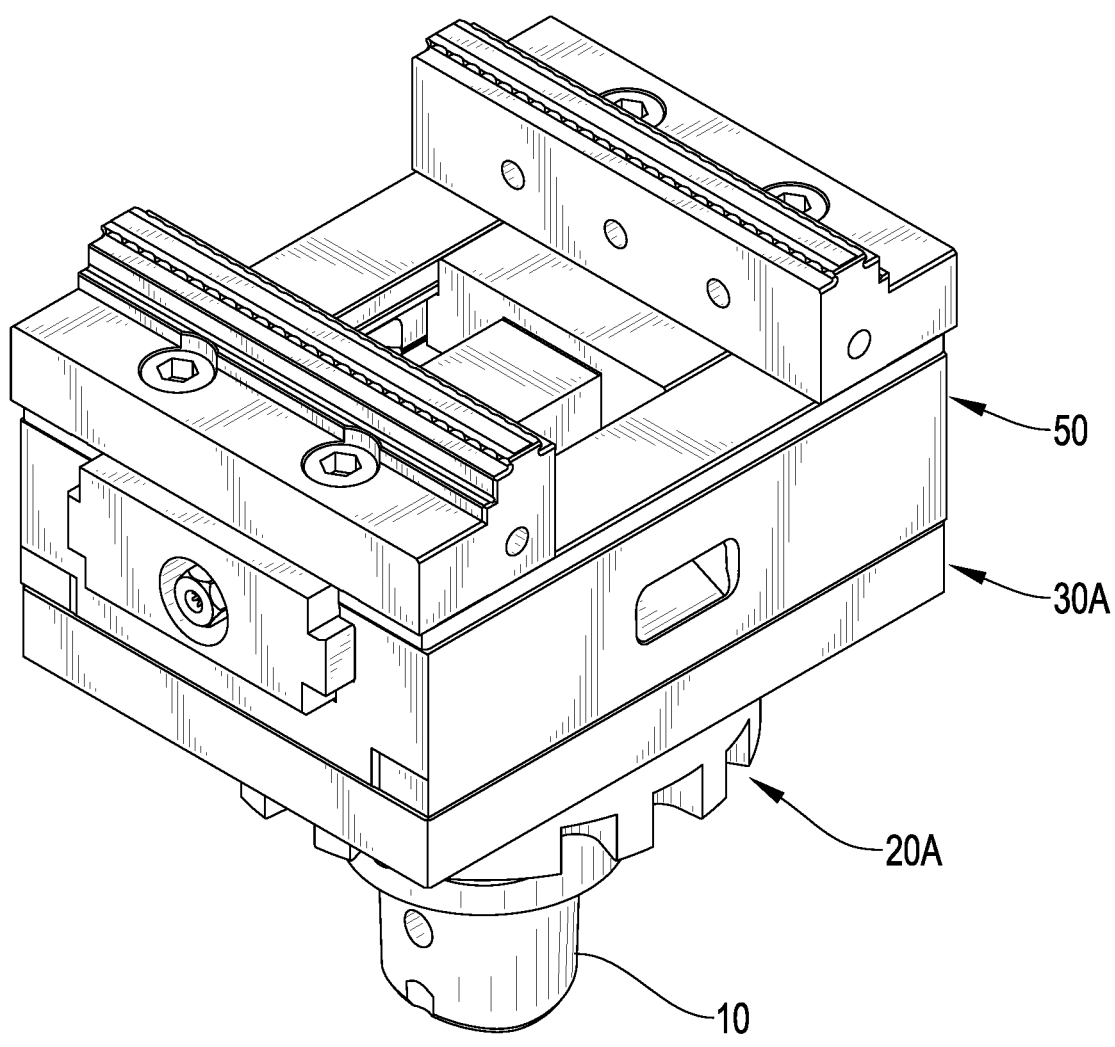
FIG. 5 is a perspective view of the automatically replaceable fixture plate in FIG. 1 applied for mounting a vise.
Figure 6:
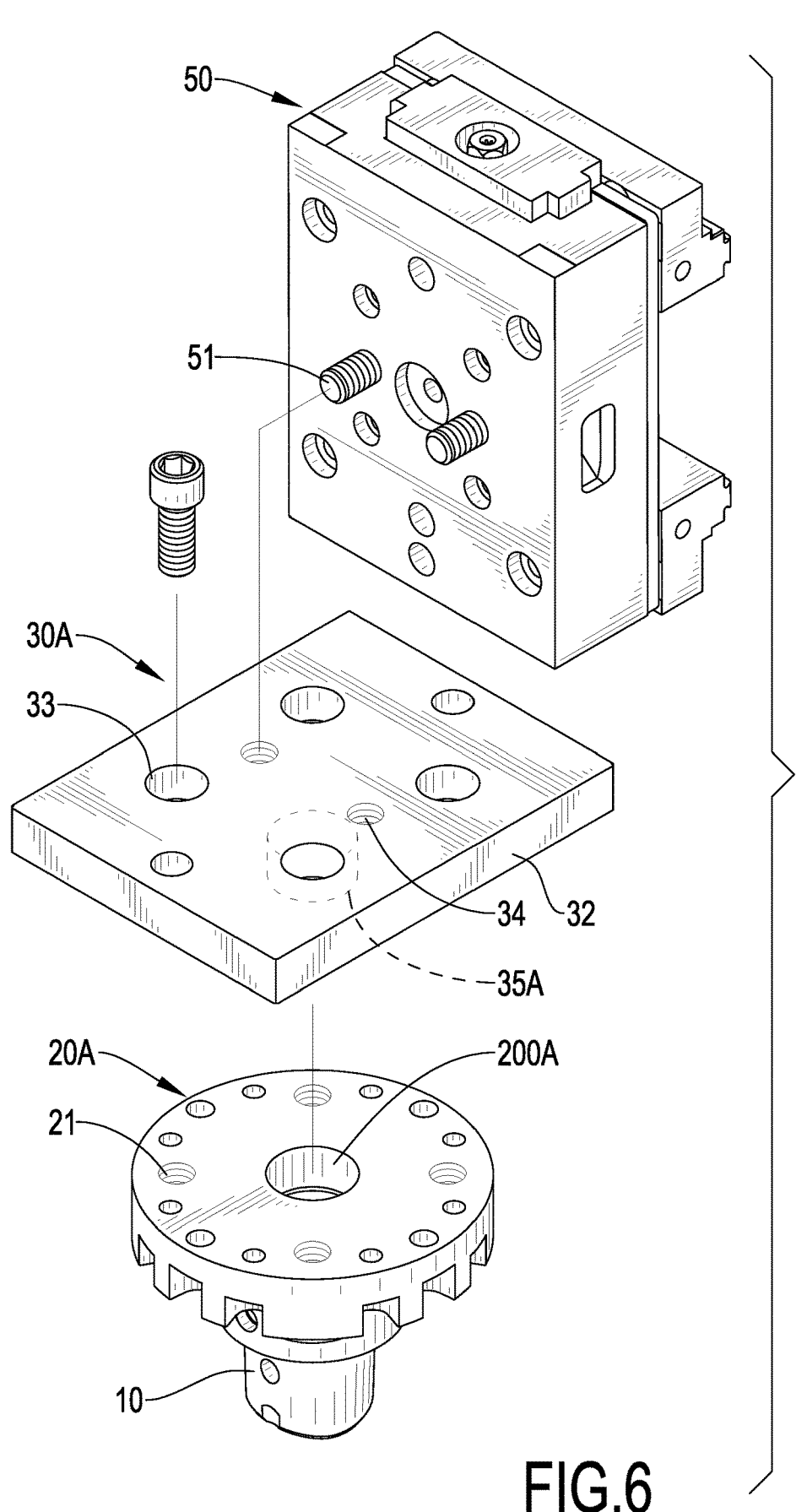
FIG. 6 is an exploded view of the automatically replaceable fixture plate in FIG. 5.

For example, with reference to FIGS. 5 and 6, another fixture mounted on the automatically replaceable fixture plate can be a vise 50 having a rectangular profile, and the vise 50 is specifically a self-centering vise. When mounting, the fixture mount 30A having the rectangular profile 32 and the main plate body 20A are fixed with respect to each other by respectively mounting bolts through the multiple mounting holes 33 being through holes and respectively screwing the bolts into the multiple threaded holes 21. Afterwards, the vise 50 is fixedly mounted onto the automatically replaceable fixture plate by mounting multiple bolts 51 through the vise 50 and respectively screwing the multiple bolts 51 into the multiple fixture mounting holes 34 being screw holes so as to fix the workpiece via the vise 50. In use, the machine tool can automatically alternate between the automatically replaceable fixture plate with the vise 50 and the automatically replaceable fixture plate with the circular clamp via the replacing arm 83.

In the above description of the first preferred embodiment, the automatically replaceable fixture plate has the fixture mount 30A having the circular profile 31 or the rectangular profile 32 to mount the circular clamp 40 having the circular profile or the vise 50 having the rectangular profile. In other embodiments, the automatically replaceable fixture plate can also directly mount the fixture onto the main plate body 20A. In the first preferred embodiment, the circular clamp 40 and the vise 50 are respectively mounted onto the fixture mounts 30A respectively having the profiles corresponding to the profile of the circular clamp 40 and the vise 50, which provides greater stability of mounting and provides the circular clamp 40 and the vise 50 with stronger support. In other embodiments, the automatically replaceable fixture plate may have the fixture mount 30A having a different profile corresponding to a profile of another type of the fixture for stability of mounting and greater supporting, which is not limited by the circular profile 31 or the rectangular profile 32 in the first preferred embodiment.

Figure 7:
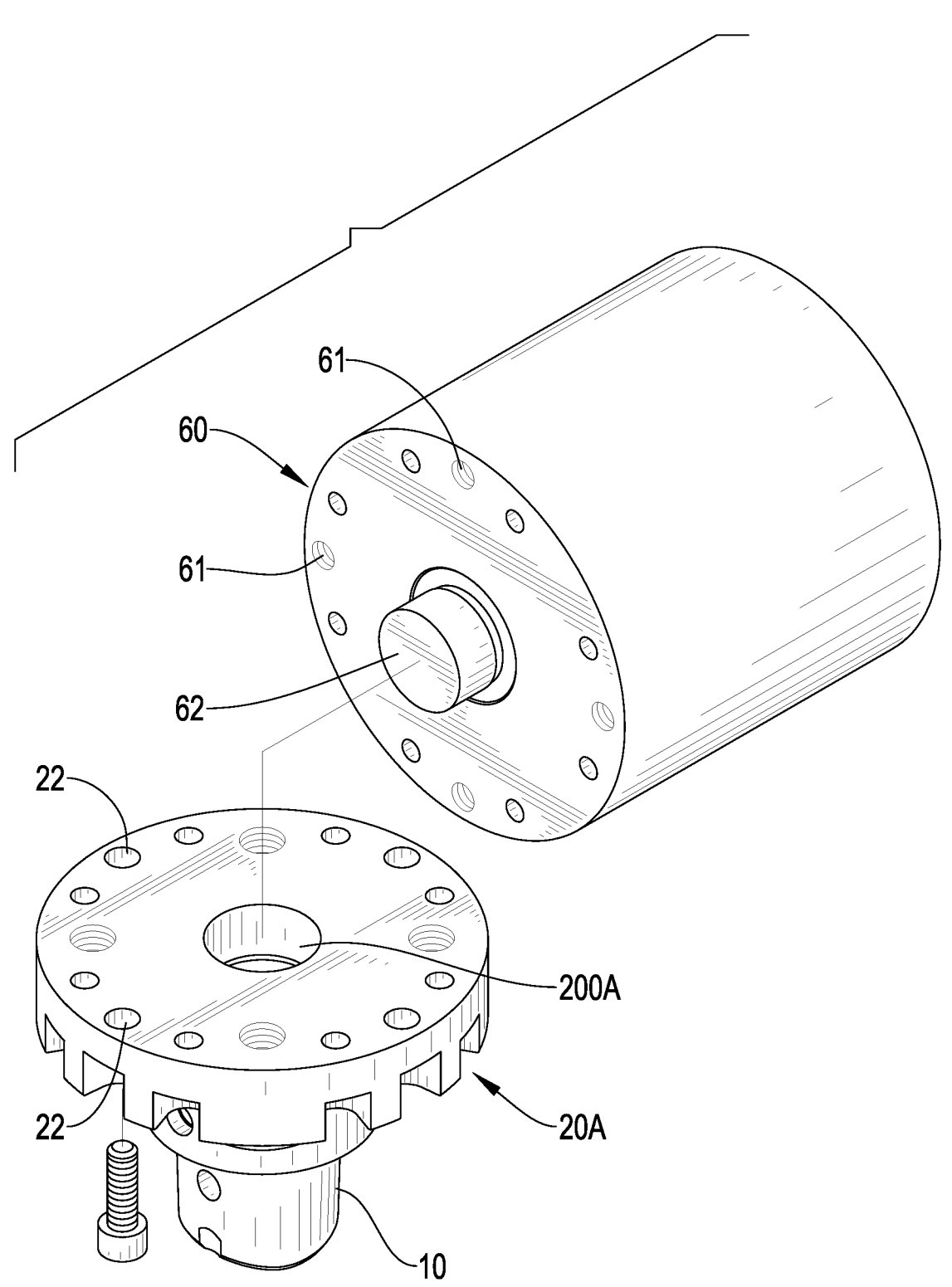
FIG. 7 is an exploded view of the automatically replaceable fixture plate in FIG. 1 applied for directly fixing a cylindrical workpiece.

Next, the mode of the main plate body 20A being fixed with respect to the workpiece is described. When no fixture is appropriate for the workpiece, the workpiece can be directly fixed on the automatically replaceable fixture plate. With reference to FIG. 7, a cylindrical workpiece 60 is fixed on the automatically replaceable fixture plate by respectively mounting bolts through the multiple through holes 22 of the main plate body 20A and respectively screwing the bolts into multiple screw holes 61 on a bottom of the cylindrical workpiece 60. Thereby, the machine tool can automatically alternate between the automatically replaceable fixture plate with the cylindrical workpiece 60, the automatically replaceable fixture plate with the vise 50, and the automatically replaceable fixture plate with the circular clamp 40 via the replacing arm 83, which allows the machine tool to automatically replace the means of fixing the workpiece and appropriately fix the workpiece via the circular clamp 40, the vise 50, or the automatically replaceable fixture plate.

The automatically replaceable fixture plate of the present invention has the post 10 configured to be clamped or released by the tightening and loosening mechanism of the saddle 81 and the main plate body 20A configured to be fixed with respect to the workpiece or the fixture for fixing the workpiece, which allows the machine tool to automatically alternate between different means of fixing the workpiece in different time periods and fix the workpiece via an appropriate fixture or the automatically replaceable fixture plate. Thereby, the machine tool can arrange times of processing different workpieces appropriate for being fixed by different fixtures, which helps to construct a flexible manufacturing system (FMS). Compared to the manual replacement of the fixture in the conventional machine tool, the present invention improves automation of the machine tool and further decreases the labor cost.

With reference to FIGS. 2, 3, and 6, in the first preferred embodiment, when the automatically replaceable fixture plate has the fixture mount 30A for mounting the fixture, the main plate body 20A has a first mounting portion 200A, and the fixture mount 30A has a second mounting portion 35A. The first mounting portion 200A is a recess, and the second mounting portion 35A is a protrusion corresponding to the recess, which allows the first mounting portion 200A and the second mounting portion 35A to be engaged with each other. When making the main plate body 20A and the fixture mount 30A fixed with respect to each other, the engagement of the first mounting portion 200A and the second mounting portion 35A limits the relative movement between the main plate body 20A and the fixture mount 30A to improve the convenience of fixing via bolts. Also, the stability of connection between the fixture mount 30A and the main plate body 20A can be strengthened.

With reference to FIG. 7, in the first preferred embodiment, when the automatically replaceable fixture plate directly fix the cylindrical workpiece 60, the main plate body 20A also has the first mounting portion 200A, the first mounting portion 200A is configured to be engaged with an assembling portion 62 of the cylindrical workpiece 60. The first mounting portion 200A is a recess, and the assembling portion 62 is a protrusion corresponding to the recess. The engagement of the first mounting portion 200A and the assembling portion 62 strengthens the stability of fixing the cylindrical workpiece 60 on the main plate body 20A.

Figure 8:
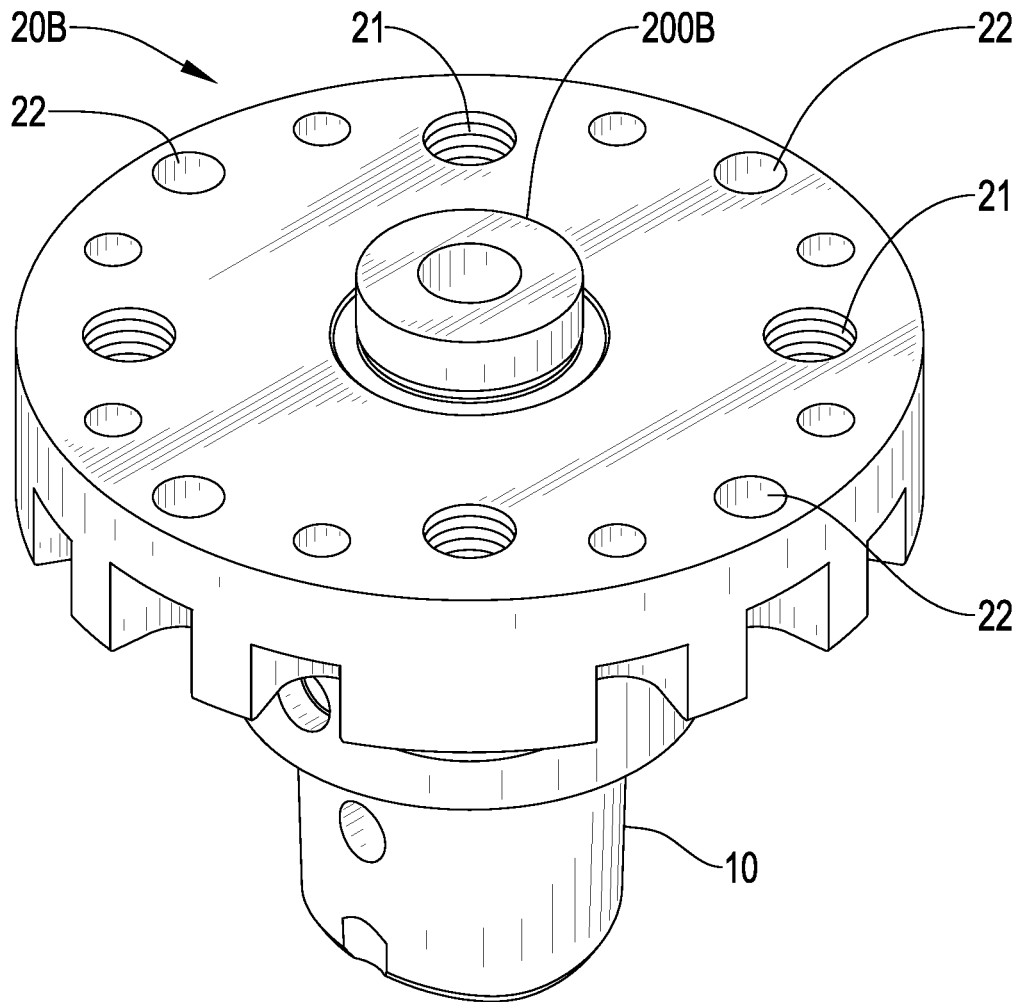
FIG. 8 is a perspective view of an automatically replaceable fixture plate of a second preferred embodiment in accordance with the present invention.
Figure 9:
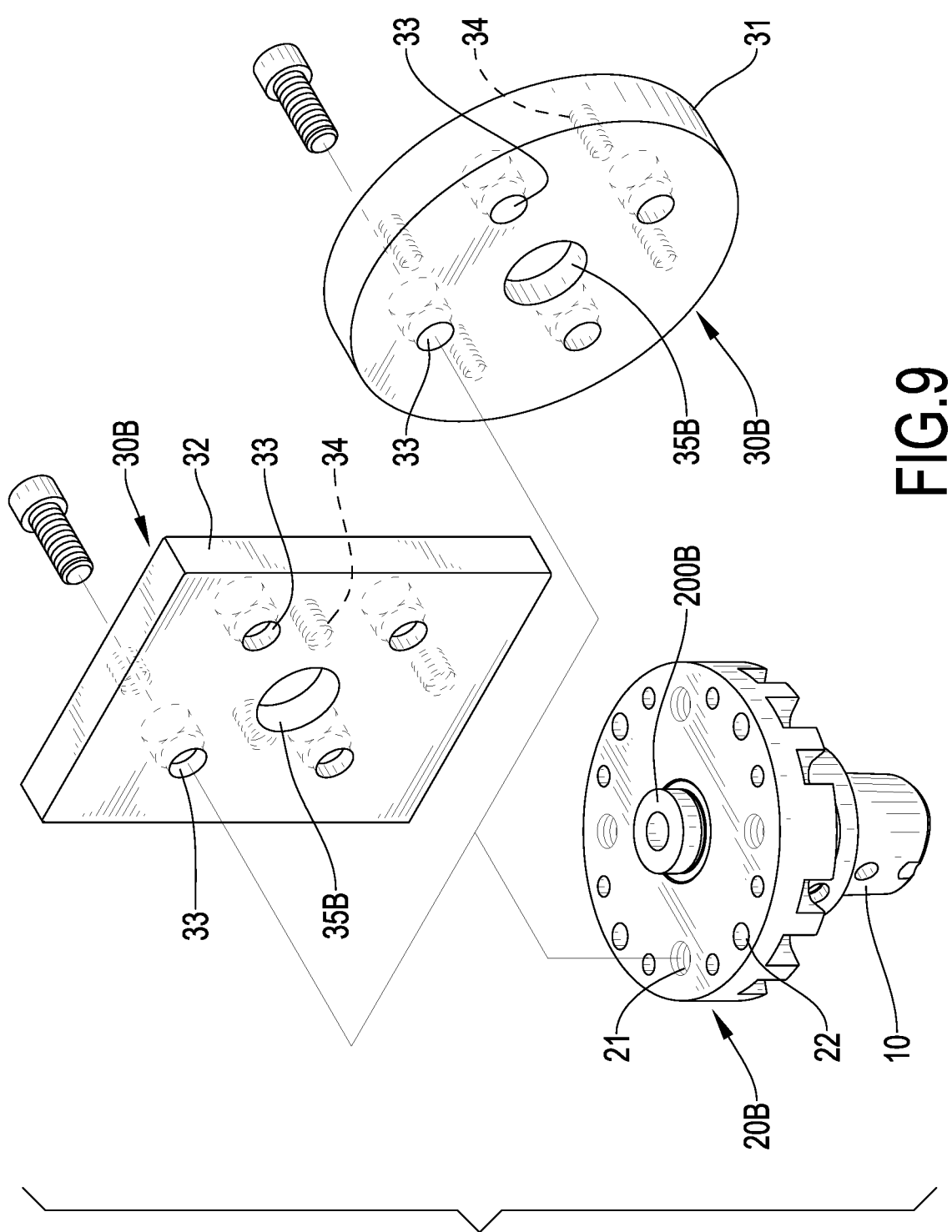
FIG. 9 is an exploded view of the automatically replaceable fixture plate in FIG. 8 having different fixture mounts.
Figure 10:
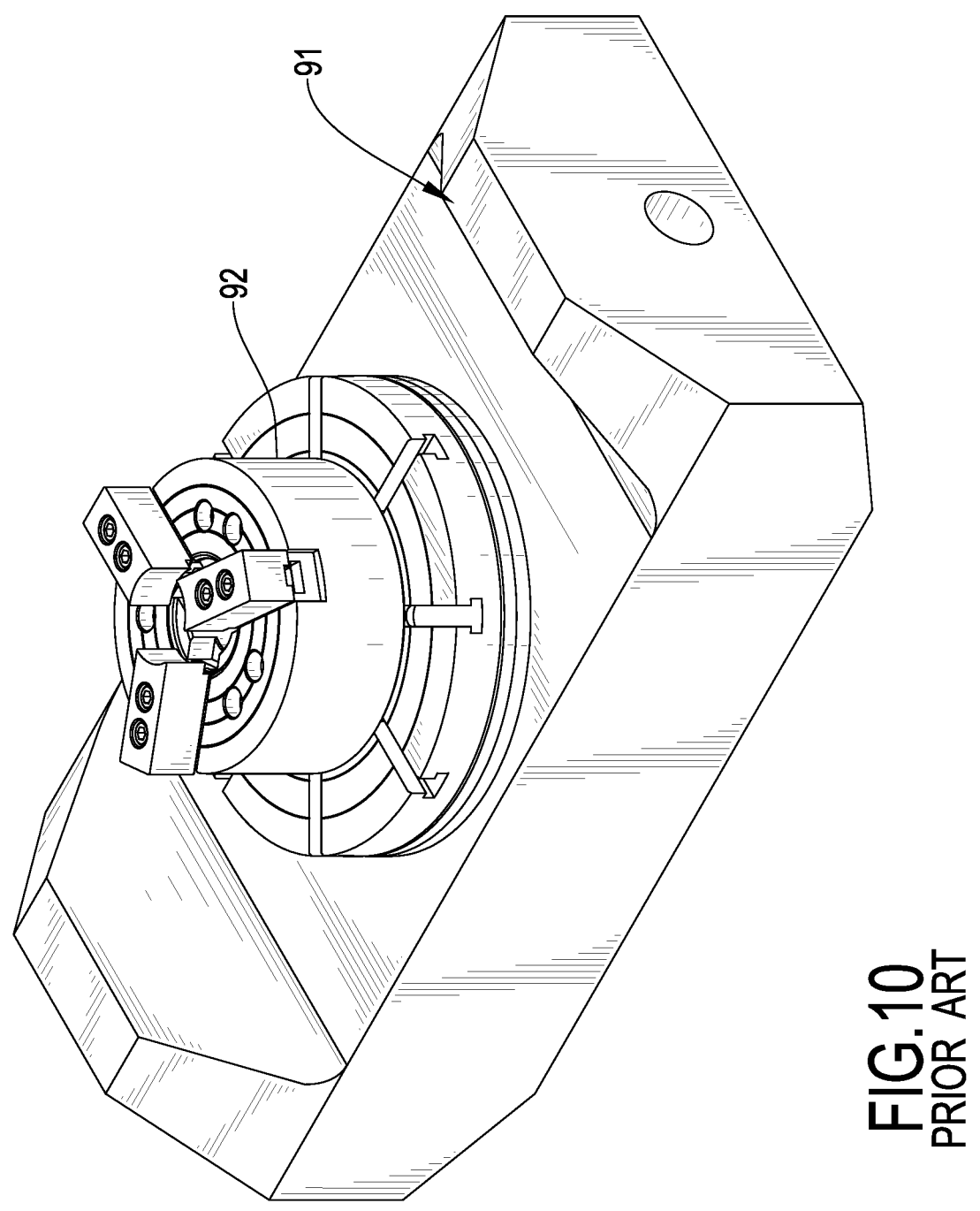
FIG. 10 is a perspective view of a saddle and a chuck in accordance with the prior art.

With reference to FIG. 8, an automatically replaceable fixture plate of a second preferred embodiment in accordance with the present invention is shown. The second preferred embodiment is basically the same as the first preferred embodiment. Differently, in the second preferred embodiment, the first mounting portion 200B of the main plate body 20B is a protrusion. With reference to FIG. 9, the automatically replaceable fixture plate of the second preferred embodiment can also have the fixture mount 30B for mounting the fixture. The fixture mount 30B is basically the same as the fixture mount 30A in the first preferred embodiment, and differently, the second mounting portion 35B of the fixture mount 30B in the second preferred embodiment is a recess configured to be engaged with the first mounting portion 20B of the main plate body 20B being the protrusion. Otherwise, when a workpiece is directly fixed on the main plate body 20B, the first mounting portion 200B is configured to be engaged with an assembling portion on the workpiece, and the assembling portion is a recess corresponding to the first mounting portion 200B being the protrusion.

In the second preferred embodiment, the first mounting portion 200B and the second mounting portion 35B are opposite configurations to the first mounting portion 200A and the second mounting portion 35A in the first preferred embodiment. The first mounting portion 200B of the main plate body 20B is the protrusion in the engagement, and the second mounting portion 35B of the fixture mount 30B or the assembling portion of the workpiece is the recess in the engagement. The second preferred embodiment provides a different configuration from the first preferred embodiment to provide same effect of limiting the relative movement between the fixture mount 30B and the main plate body 20B to improve convenience of fixing via bolts and strengthening the stability of connection between the fixture mount 30A and the main plate body 20A.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An automatically replaceable fixture plate configured to be mounted onto a saddle in a machine tool and to mount a fixture for fixing a workpiece thereon; the saddle having a tightening and loosening mechanism, and the automatically replaceable fixture plate comprising:

a post configured to be clamped or released by the tightening and loosening mechanism for being fixed to the saddle or detached from the saddle;

a main plate body fixed to the post and having multiple fixing holes;

wherein the automatically replaceable fixture plate has a fixture mount having a profile matching with a profile of the fixture, and the fixture mount has multiple mounting holes, each one of the multiple mounting holes aligned with a respective one of the multiple fixing holes;

multiple fixture mounting holes configured to make the fixture mount and the fixture fixed with respect to each other via bolts;

the main plate body has a first mounting portion integrally formed thereon;

the fixture mount has a second mounting portion integrally formed thereon;

the first mounting portion and the second mounting portion are engageable with each other; and after the first mounting portion and the second mounting portion are engaged with each other, each one of the multiple mounting holes and the corresponding one of the multiple fixing holes are threaded to be combined via a threaded bolt for fixing the fixture mount and the main plate body.

2. The automatically replaceable fixture plate as claimed in claim 1, wherein the profile of the fixture mount is a circular profile or a rectangular profile.

3. The automatically replaceable fixture plate as claimed in claim 2, wherein the multiple fixing holes of the main plate body include multiple threaded holes and multiple through holes.

4. The automatically replaceable fixture plate as claimed in claim 1, wherein the first mounting portion and the second mounting portion are respectively a protrusion and a recess;

when the first mounting portion is the protrusion, the second mounting portion is the recess; or when the first mounting portion is the recess, the second mounting portion is the protrusion.

5. The automatically replaceable fixture plate as claimed in claim 4, wherein the multiple fixing holes of the main plate body include multiple threaded holes and multiple through holes.

6. The automatically replaceable fixture plate as claimed in claim 1, wherein the multiple fixing holes of the main plate body include multiple threaded holes and multiple through holes.

\* \* \* \* \*